United States Patent
Honda et al.

(10) Patent No.: US 7,474,422 B2
(45) Date of Patent: Jan. 6, 2009

(54) DATA TRANSMISSION APPARATUS CONTROLLING TRANSMISSION OF A REQUIRED AMOUNT OF DATA AND A DATA TRANSMISSION CONTROL METHOD THEREFOR

(75) Inventors: Takeshi Honda, Aichi (JP); Akihiro Takahashi, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1860 days.

(21) Appl. No.: 10/053,727

(22) Filed: Jan. 24, 2002

(65) Prior Publication Data
US 2002/0118388 A1    Aug. 29, 2002

(30) Foreign Application Priority Data
Feb. 26, 2001    (JP) .............................. 2001-050248

(51) Int. Cl.
*G06F 3/12* (2006.01)
*G06K 15/00* (2006.01)

(52) U.S. Cl. ...................... 358/1.15; 358/1.14; 358/1.1; 370/278

(58) Field of Classification Search ................ 358/1.15, 358/1.14, 1.1, 1.2, 1.5, 1.6, 1.9, 1.11, 1.13, 358/1.16, 1.17, 1.18, 400, 401, 405, 407, 358/425, 426.01, 419, 422, 426.02, 426.03, 358/426.04, 426.06, 426.07, 426.08, 426.09, 358/426.11, 426.12, 434, 435, 436, 437, 358/438, 439, 442, 468; 347/2, 3, 5, 14, 347/23; 399/1, 8, 9; 709/223, 224; 710/1, 710/20, 262, 261, 266, 48, 34, 35, 33; 370/278, 370/281, 341, 488, 489, 490, 491, 492, 493, 370/463, 464, 465, 466, 467, 468, 469, 244, 370/eb252, 316, 230.1, 474, 453; 375/240.03, 375/346, 285, 345; 455/427, 453, 524; 714/4, 714/43, 47, 51, 56
See application file for complete search history.

(56) References Cited

U.S. PATENT DOCUMENTS 6,975,598 B2 * 12/2005 Honda et al. ................ 370/278
2003/0086515 A1 * 5/2003 Trans et al. ................. 375/346

* cited by examiner

*Primary Examiner*—Dov Popovici
(74) *Attorney, Agent, or Firm*—Rabin & Berdo, PC (57) ABSTRACT

A data transmission apparatus transmits, in response to a permission signal received from a higher-level data receiver, a required amount of data to the data receiver in a burst. The required amount of data is determined by data transmission control. Data transmission between the apparatus and the data receiver is effected at a preselected timing in such a manner as to absorb a difference between the amount of data to be transmitted over a preselected management time period and the data amount indicated by an expected control value. For this purpose, the apparatus calculates an adequate amount of data to be transmitted over the management time period as a unit amount. The apparatus then manages the maximum amount of data to be transmitted over the management time period for thereby leveling the amounts of data transmitted. This successfully enhances accurate data transmission.

10 Claims, 7 Drawing Sheets

DATA TRANSMISSION APPARATUS CONTROLLING TRANSMISSION OF A REQUIRED AMOUNT OF DATA AND A DATA TRANSMISSION CONTROL METHOD THEREFOR

BACKGROUND OF THE INVENTION

1. Field of the Invention

The present invention relates to a data transmission apparatus, and, more particularly, to a data transmission apparatus of the type transmitting, upon receiving a permission from a higher-level data receiver, a required amount of data to the data receiver, and to a data transmission control method therefor.

2. Description of the Background Art

A data transmission apparatus of the type described transmits data in bursts to a higher-level data receiver connected thereto. More specifically, the data type of transmission apparatus should transmit data in the form of consecutive data sequences, in each of which data not exceeding a preselected unit amount is transmitted. The data transmission apparatus is sometimes required to control the mean amount of data transmitted for a unit period of time to a preselected value. Therefore, circuitry capable of satisfying such different conditions consistently is essential with the data transmission apparatus. This circuitry may generally be configured to establish a reference threshold, below which an amount of data is controlled to be transmitted for a unit period of time.

In practice, however, the data transmission apparatus cannot easily absorb, condition by condition, an error or difference between an amount of data actually output and an expected control value by simply executing control with an invariable value. The apparatus cannot achieve accuracy satisfying the conditions described above unless it absorbs such an error. Moreover, the errors are dependent upon a unit amount and a mean amount of data to be transmitted, which are conditioned from the outside of the apparatus. Specifically, the error increases with an increase in the unit amount of data and with a decrease in the mean amount of data, lowering the expected value of data transmission.

SUMMARY OF THE INVENTION

It is an object of the present invention to provide a data transmission apparatus capable of leveling the amounts of data to be transmitted and transmitting data with its amount accurately controlled under desired conditions, and a data transmission control method therefor.

In accordance with the present invention, a data transmission apparatus sends out a transmission request signal to a data receiver and transmits, on receiving a transmission permission signal from the data receiver, data to the data receiver. The apparatus includes a data transmitter for transmitting data input thereto to the data receiver. A transmission time calculator calculates a transmission time period up to the time when the data transmitted reaches an amount determined in accordance with a plurality of parameters, which are input from the outside of the apparatus. A control circuit sets, based on the transmission time period, the maximum amount of data to be transmitted next and controls the transmission of the data. The control circuit includes a management time calculator for converting the transmission time period to a unit management time period representative of a transmission in unit time for management, determining allowable unit management time periods allowable for the unit management time period, selecting one of the allowable unit management time periods as management time period, calculating the maximum amount of data, and generating a timing signal indicative of the elapse of the management time period. An accumulator manager holds and manages the total amount of data transmitted. A maximum transmission amount generator generates the maximum amount of data to be transmitted next as a limit while updating the limit. A monitor/controller compares the total amount with the maximum amount, inhibits, based on the result of comparison, the data transmitter from transmitting data or canceling the inhibition while holding, when the total amount exceeds the maximum amount, a difference between the total amount and the maximum amount, and feeds the difference to the maximum transmission amount generator.

Also, in accordance with the present invention, a data transmission control method of the above-described data transmission apparatus begins with the step of setting a plurality of parameters input from the outside of the apparatus. There are generated a transmission time period up to the time when the data transmitted reaches an amount matching with the plurality of parameters and a unit management time period representative of a transmission time for managing the transmission time period. One of allowable unit management time periods lying in a range allowable for the unit management time period is selected as a management time period. A maximum amount of data to be transmitted for the management time period is generated as a limit. The data are transmitted to the data receiver in response to a transmission permission signal that the data receiver returns in response to a transmission request signal sent out from the apparatus. The total amount of data transmitted is held and managed. The total amount and maximum amount are compared with each other. If the total amount is smaller than the maximum amount, then a time interval for which the data is transmitted in a burst is counted to thereby determine whether or not the time interval has expired. If the total amount is greater than the maximum amount, then the transmission of the data is interrupted while an excess value produced by subtracting the maximum amount from the total amount is held. Whether or not the management time has expired is determined. If the management time has not expired, then the procedure returns to the data transmitting step. If the management time has expired, then a difference between the maximum amount and the excess value is set as a new limit. The interruption of the transmission of the data is canceled after the limit has been updated. The total amount, excess value and management time period are reset after the cancellation of the interruption. This step is again followed by the data transmitting step.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
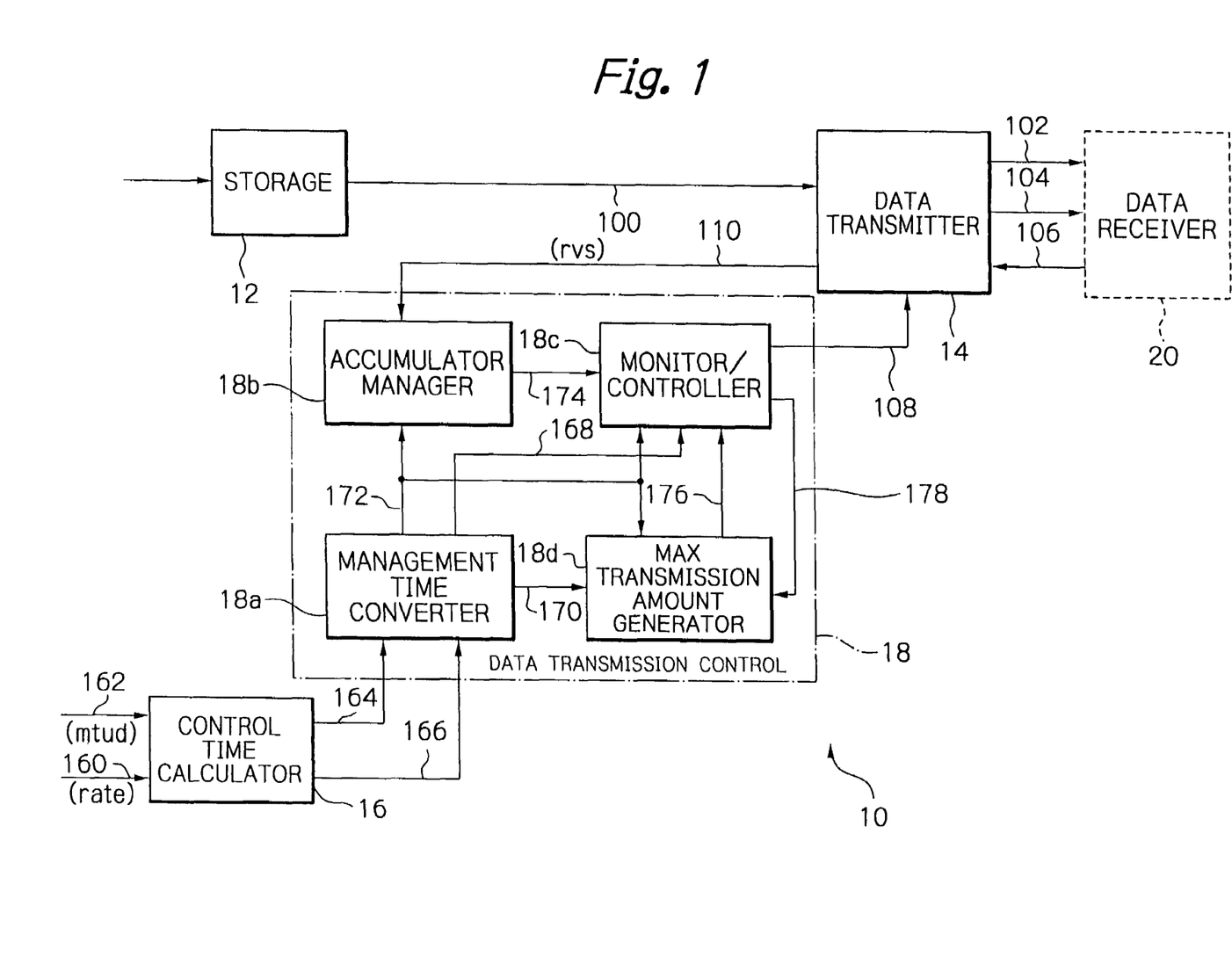
FIG. 1 is a schematic block diagram showing a data transmission apparatus embodying the present invention.

Referring to FIG. 1 of the drawings, a data transmission apparatus embodying the present invention is generally designated by the reference numeral 10. It is to be noted that part of the data transmission apparatus 10 not directly relevant to the understanding of the present invention is not shown nor will be described. Signals appearing in the circuitry of FIG. 1 are designated by reference numerals attached to connection lines on which they appear.

As shown in FIG. 1, the data transmission apparatus 10 is generally made up of a storage 12, a data transmitter 14, a control time calculator 16, and a data transmission control 18. The reference numeral 20 designates a higher-level data receiver to which the apparatus 10 is connected. The data transmission control 18 includes a management time converter 18a, an accumulator manager 18b, a monitor/controller 18c, and a maximum (MAX) transmission amount generator 18d.

The apparatus 10 is adapted to transmit, in response to an output permission signal 106 received from the data receiver 20, a required amount of data 102 to the data receiver 20 in a burst. The required amount of data is determined by the data transmission control 18. Data transmission between the apparatus 10 and the data receiver 20 is effected at a preselected timing in such a manner as to absorb a difference between the amount of data to be transmitted over a preselected management period of time, or preselected condition, and a target value indicated by an expected control value. For this purpose, the apparatus 10 establishes an adequate amount of data allowable to be transmitted over the management period of time as a unit amount. The apparatus 10 then manages the limit or maximum amount of data allowable to be transmitted over the management period of time for thereby leveling the amounts of data transmitted. This successfully enhances accurate data transmission.

More specifically, the storage 12 includes a buffer memory or similar memory circuit and feeds data 100 stored therein to the data transmitter 14. The storage 12 serves to buffer data to be input to the data transmitter 14.

The data transmitter 14 transmits the data 100 to the data receiver 20 as an output signal 102. Further, the data transmitter 14 transmits a transmission request signal 104 to the data receiver 20 and receives an output permission signal 106 from the receiver 20. On receiving the output permission signal 106, the data transmitter 14 transmits a required amount of data 102 to the data receiver 20 with its output control function. More specifically, the data transmission control 18 feeds a control signal 108 to the data transmitter 14 in order to activate the output control function of the data transmitter 14. If desired, the monitor/controller 18c included in the data transmission control 18 may be adapted to use the maximum amount as a limit to control the amount of data to be transmitted. Further, the data transmitter 14 delivers a value (rvs) 110, which is representative of the amount of data actually transmitted, to an addition manager 18b also included in the data transmission control 18.

In addition, the data transmitter 14 generates a flag signal (link) showing that the apparatus 10 has started transmitting data in response to a request, as will be described with reference to FIG. 2 later. The flag signal (link) is fed to the data transmission control 18. In the illustrative embodiment, the data transmitter 14 generates the flag signal over a single pulse duration of a system clock.

Figure 2:
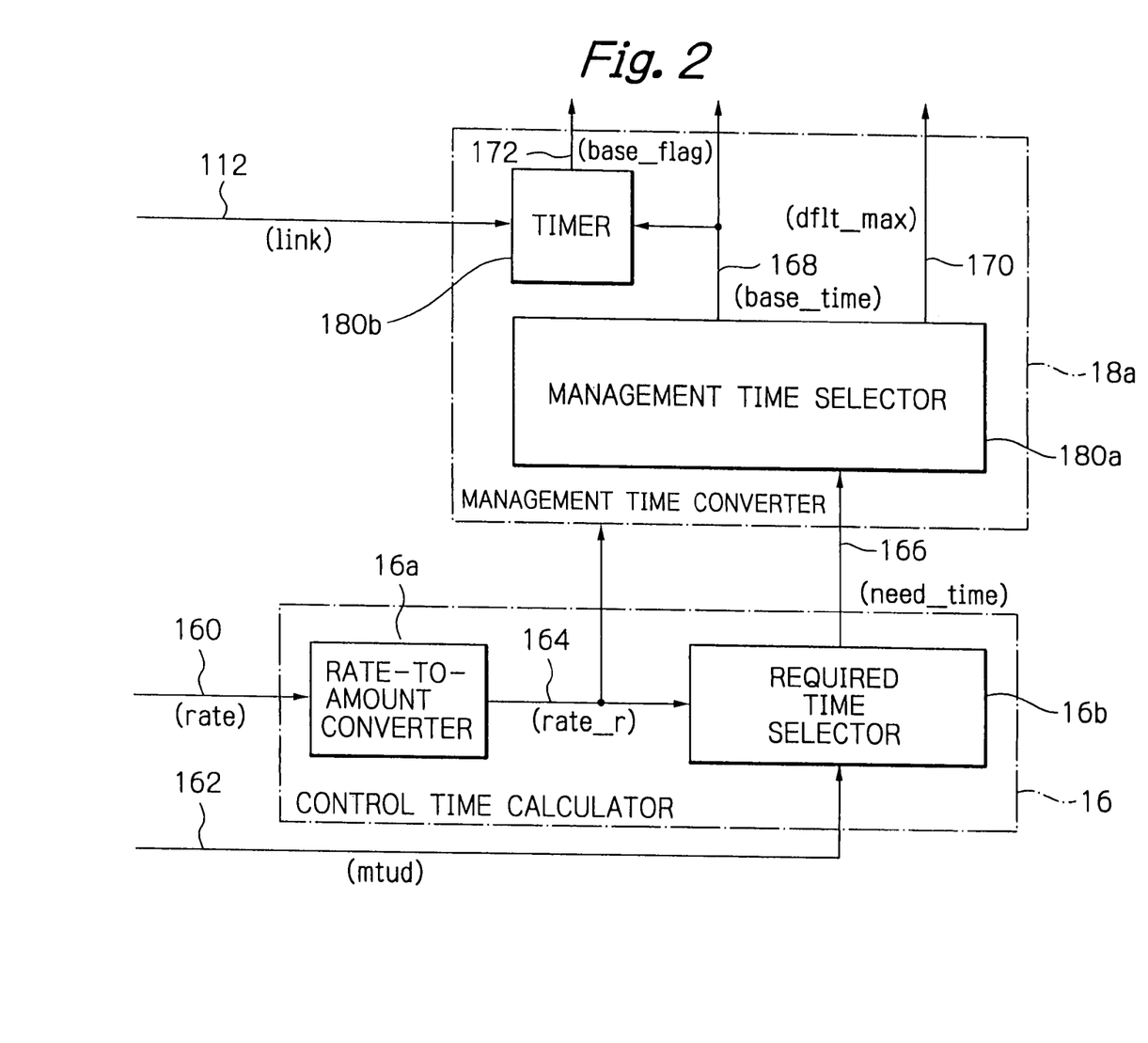
FIG. 2 is a schematic block diagram showing a specific configuration of a control time calculator and a management time converter included in the illustrative embodiment.

As shown in FIG. 2, the control time calculator 16 includes a rate-to-amount converter 16a and a required time selector 16b. The control time calculator 16 receives and holds a plurality of parameters from the outside of the apparatus 10 in order to estimate a period of time necessary for transmission. The parameters mentioned above include a rate 160 and a unit data amount (mtud) 162. The rate 160 is representative of an amount of data to be transmitted for a unit period of time. In practice, rates lying in a preselected range are adequately used. The unit data amount (mtud) 162 is an integral variable representative of the amount of data to be transmitted at a time. The unit data amount 162 is equal to the minimum amount of data to be transmitted at a time.

The rate-to-amount converter 16a converts the rate 160 input thereto to a value representing the amount of data to be transmitted in a burst (rate_r) 164. In the illustrative embodiment, data is transmitted at a burst interval, which will be referred to as a unit burst control time hereinafter. For a simple circuit configuration, the rate-to-amount converter 16a is adapted to store a conversion table listing rates and values representing the amount of data to be transmitted for a unit burst control time.

The rate-to-amount converter 16a converts the rate 160 to the value (rate_r) representing the amount of data to be transmitted for a unit burst control time, as stated above. At this instant, the converter 16a selects a plurality of data amounts lying in a certain range out of the conversion table as candidates. The converter 16a then selects smaller one of the candidates, as will be described more specifically later. The converter 16a delivers the data amount (rate_r) 164 thus selected to the required time selector 16b and a management time selector 180a, which is included in the management time converter 18a.

The required time selector 16b estimates and holds a period of time (need_time) necessary for transferring the unit amount or minimum amount of data (mtud) at the rate. More specifically, the selector 16b divides the unit data amount (mtud) by the value representative of the amount of data to be transferred for a unit burst control time (rate_r), thereby determining a required period of time (need_time) The required period of time, labeled 166, is therefore an integral multiple of the unit burst control time. The selector 16 feeds the required period of time (need_time) 166 to the management time selector 180a.

Referring again to FIG. 1, the data transmission control 18 takes account of the required period of time (need_time) 166 and the data amount 110 output from the control time calculator 16 and data transmitter 14, respectively, to control the data transmitter 14. More specifically, the management time converter 18a converts the required period of time 166 to a unit time period for managing data transmission, thereby finally selecting a management time period (base_time). For this purpose, the converter 18a may be adapted to use a conversion table, not shown, by way of example. Further, the converter 18a calculates the maximum amount of data (dflt_max) that can be transmitted at the previously mentioned rate for the above unit time period. In addition, the converter 18a reports the elapse of the unit time period. For the aim, the converter 18a includes a timer 180b in addition to the management time selector 180a.

The function of converting the required period of time 166 to the unit time period and the function of calculating the maximum data amount (dflt_max) are assigned to the management time selector 180a, FIG. 2. Specifically, the selector 180a stores data in a conversion table, not shown, listing required periods of time 166 and management time periods corresponding thereto and calculated beforehand. In addition, the selector 180a includes a circuit for calculating the maximum data amount (dflt_max) although not shown specifically. The selector 180a selects a management time period corresponding to the required period of time 166 as a unit management time period. The conversion table is provided to simplify the circuit configuration.

More specifically, the management time selector 180a finds out a certain allowable range of unit management time periods on the conversion table for a given required period of time 166. Those allowable management time periods are the candidates for a target management time period. The selector 180a selects one of the candidates that is longer than a unit management time period corresponding to the required period of time as a management time period (base_time). The selector 180a feeds the management time period, labeled 168, to the timer 180b and monitor/controller 18c. In this manner, the selector 180a selects a management time period by stepwise sampling based on numeric amounts.

The management time selector 180a additionally includes a circuit, not shown, for calculating the maximum data amount (dflt_max) that can be transmitted for the management time period selected. The maximum data amount is the product of the data amount (rate_r) for a unit burst control time and the management time period (base_time). The selector 180a delivers the maximum data amount, labeled 170, to the maximum transmission amount generator 18d shown in FIG. 1 while holding it therein.

The timer 180b sets the management time period and counts time. When the management time period expires, the timer 180b outputs a flag signal for management (base_flag) 172 as a timing signal. More specifically, the timer 180b starts timing in response to the previously mentioned flag signal (link), labeled 112, output from the data transmitter 14 and indicative of the start of data transmission. If desired, the timer 180b may be adapted to count the unit burst control times, in which case the timer 180b is adapted to convert its count based on the unit burst control time to a count based on the unit burst control time to a count based upon the management time period.

Referring again to FIG. 1, the accumulator manager 18b receives amount data 110 representative of the amount of data transmitted from the data transmitter 14 over each management time period. The accumulator manager 18b adds the amount data 110 to its accumulated value representing the total amount of data transmitted in the past, thereby producing a sum (sum_dsz) 174. The accumulator manager 18b delivers the sum 174 to the monitor/controller 18c while holding it therein. The accumulator manager 18b resets itself in response to the flag signal (base_flag) 172 output from the management time converter 18a.

The monitor/controller 18c compares the sum (sum_dsz) 174 with the upper limit of the amount of data (limit), labeled 176, which may be transmitted over each management time period and executes control in accordance with the result of comparison. For this purpose, the monitor/controller 18c includes a comparator, a calculator and a control signal generator although not shown specifically. The comparator determines whether or not the sum 174 is greater than the above-mentioned limit. The calculator calculates, if the sum 174 is greater than the limit, an excess of the sum 174 to produce an excess value (exceed) 178. The control signal generator outputs a control signal (req_stop) 108 when the comparator determines that the sum 174 is greater than the limit.

More specifically, the monitor/controller 18c is connected to the management time converter 18a so that it receives the management time period 168 and a flag signal for management 172 from the converter 18a. Also, the monitor/controller 18c is connected to the accumulator manager 18b so that it receives the sum 174 from the manager 18b. The monitor/controller 18c delivers the excess 178 derived from those signals to the maximum transmission amount generator 18d while holding it therein. The control signal (req_stop) 108, which goes high when the sum 174 is greater than the limit, is fed from the monitor/controller 18c to the data transmitter 14. After the monitor/controller 18c has received the flag signal for management (base_flag) 172, it executes processing for causing the control signal 108 to go low and processing for resetting the excess 178.

The maximum transmission amount generator 18d generates the limit representative of the upper limit of the amount of data which may be transmitted over the management time period. The management time converter 18a delivers the maximum data amount (dflt_max) 170 to the maximum transmission amount generator 18d as an initial limit. The monitor/controller 18c delivers the excess value (exceed) 178 to the maximum transmission amount generator 18d. The maximum transmission amount generator 18d updates the initial limit with a new limit (dflt_max) generated for the next burst.

The maximum transmission amount generator 18d produces a difference between the maximum data amount (dflt_max) and the excess value (exceed) to generate the next limit (dflt_max). The generator 18d sets the next maximum data amount (dflt_max) as the limit (limit) 176 in response to the flag signal 172 while feeding the maximum data amount (dflt_max) to the monitor/controller 18c.

The maximum transmission amount generator 18d updates the maximum data amount (dflt_max) with the excess, which is reset by the flag signal for management 172, as stated above. More specifically, the excess is a difference between the sum (sum_dsz) 174 and the maximum amount of data which may be transmitted. The maximum transmission amount generator 18d produces a difference between the maximum data amount (dflt_max) and the excess value (exceed) to thereby determine a new maximum data amount. It will therefore be seen that the sum 174 and excess 178 should be reset after the generator 18d has determined a new maximum value. This can desirably be done if the accumulator manager 18b and the monitor/controller 18c slightly delay the time for feeding the flag signal (base_flag) 172. The flag signal 172 is output in a system clock duration. In the illustrative embodiment, the flag signal 172 is fed to the accumulator manager 18b and monitor/controller 18c with a delay corresponding to one clock pulse duration.

In FIG. 1, the connection of the flag signal (base$_{13}$ flag) 172 is represented by a single signal line for simplicity. In practice, the management time converter 18a feeds the flag signal for management to the maximum transmission amount generator 18d, and the maximum transmission amount generator 18d delays the flag signal by a period corresponding to one clock pulse to feed the delayed flag signal to the accumulator manager 18b and a memory, not shown, included in the monitor/controller 18c for storing the excess value (exceed).

Figure 3:
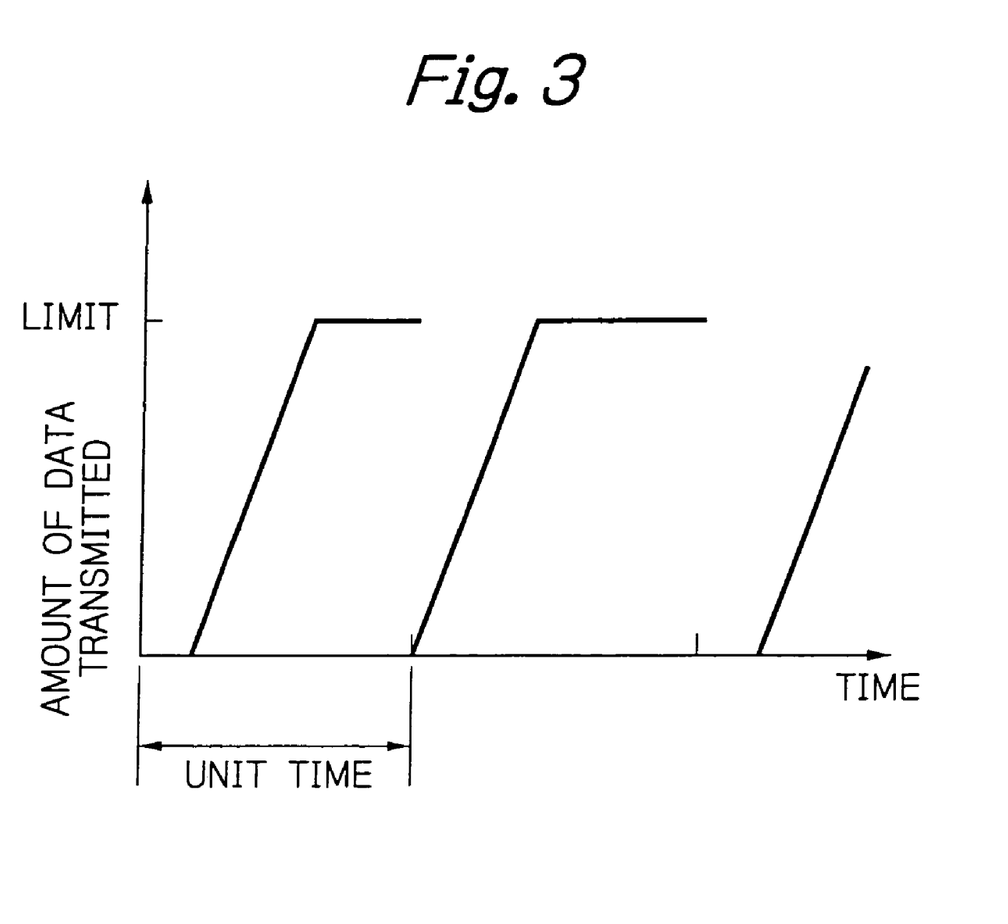
FIG. 3 is a timing chart useful for understanding the principle of operation of the illustrative embodiment.

The operation of the data transmission apparatus 10 will be described hereinafter. The apparatus 10 should transmit a preselected unit amount of data not exceeding the upper limit in a burst. Further, the apparatus 10 should level the amounts of data to be transmitted for a unit time. As shown in FIG. 3, the apparatus 10 meets the above requirements by interrupting transmission every time the cumulative amount of data transmitted reaches the upper limit. This eventually levels the amounts of data to be transmitted for a unit time.

A state-of-art data transmission apparatus could not simply, easily absorb an error between the amount of data actually transmitted and the amount of data expected to be sent under the control using the upper limit, as well known in the art. The error has such a nature that the expected amount of data decreases with an increase in the amount of data transmitted for a unit time and with a decrease in the mean amount of data transmitted for a unit time.

Figure 4:
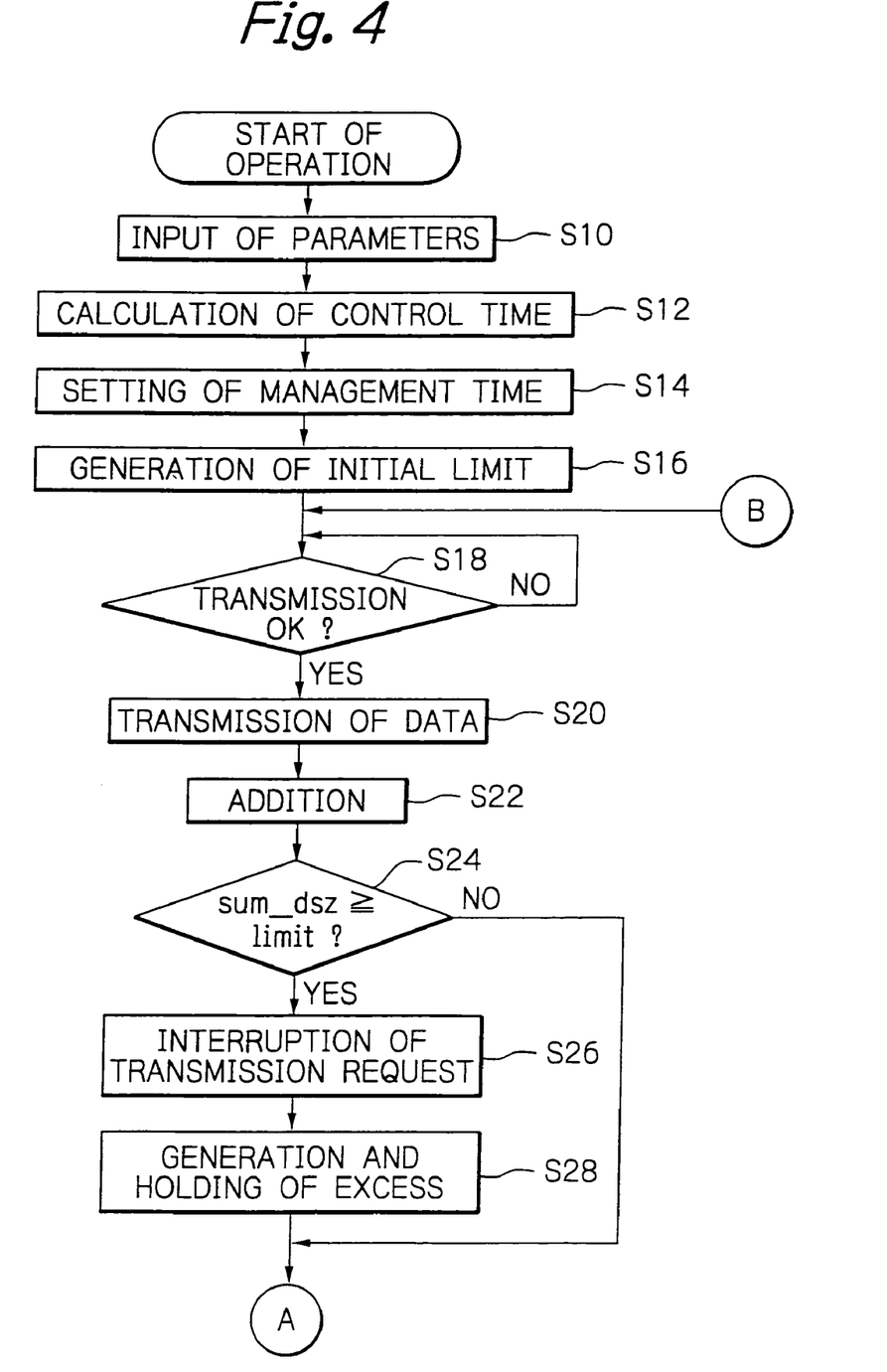
FIGS. 4 and 5 are flowcharts showing a specific operation of the illustrative embodiment.
Figure 5:
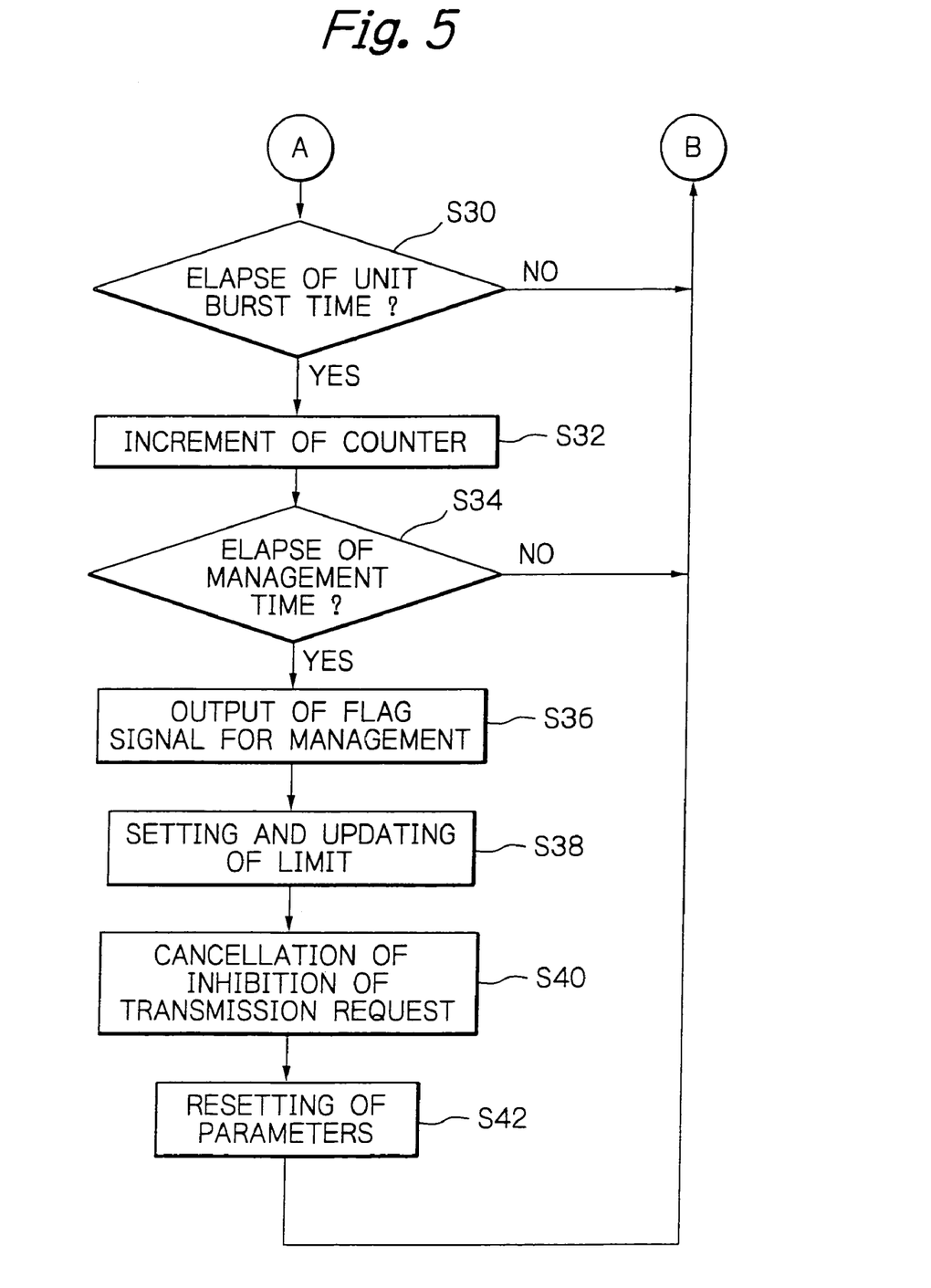
Figure 6:
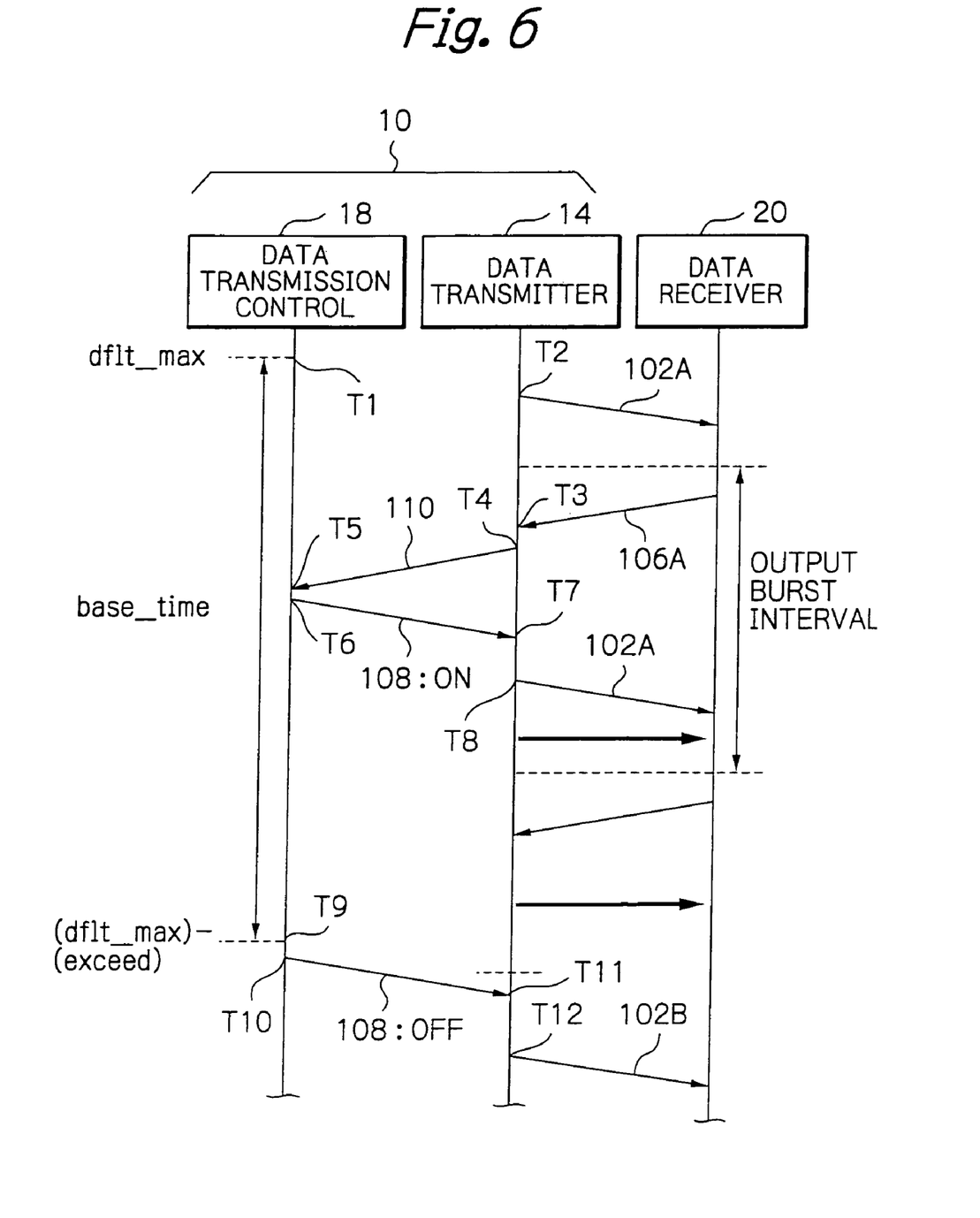
FIG. 6 is a sequence chart demonstrating a more specific sequence unique to the illustrative embodiment.

Referring to FIGS. 4, 5 and 6, how the illustrative embodiment absorbs the above-mentioned error and thereby levels the amounts of data to be transmitted will be described as simply as possible. Details of the operation, including the selection of the transmission time and management time, will be described more specifically later.

As shown in FIG. 4, on the start of operation of the data transmission apparatus 10, a rate 160 and a unit data amount (mtud) 162 are input to the control time calculator 16 as parameters (step S10). In response, the control time calculator 16 converts the rate 160 to a data amount (rate_r) 164 for a unit burst control time by using the conversion table mentioned earlier. The control time calculator 16 then calculates a control time, which refers to the required period of time (need_time) 166, (step S12). More specifically, the calculator 16 divides the unit data amount (mtud) 162 by the rate 160 to thereby determine the control time.

Subsequently, the management time converter 18a determines a management time period (base_time) 168 (step S14). Specifically, the management time converter 18a converts the control time 166 fed from the control time calculator 16 to a management time period 168 by referencing a conversion table. In addition, the converter 18a generates a timing indicative of the elapse of the management time period and the flag signal 172 for management, as will be described in detail later.

After the step S14, the management time converter 18a produces an initial maximum data amount (dflt_max) 170 that can be transmitted for the management time (step S16). As shown in FIG. 6, the initial maximum data amount 170 is set at a timing T1. The timer 180b starts counting the management time period (base_time) 168 at the timing T1, although not shown in FIG. 4 specifically.

If data to be transmitted exist in the data transmitter 14 when the above setting has completed, then the data transmitter 14 sends out a transmission request signal 102A to the higher-level data receiver 20 at a timing T2 shown in FIG. 6. Subsequently, it is determined whether or not the data transmitter 10 has received a transmission permission signal 106A from the data receiver 20 (step S18). If the answer of the step S18 is negative (NO), then the step S18 is repeated. If the answer of the step S18 is positive (YES), then it is determined that the data receiver 20 has permitted data transmission from the data transmitter 10. In FIG. 6, the time when the data transmitter 14 receives the transmission permission signal 106A is represented by a timing T3.

On receiving the transmission permission signal 106A, the data transmitter 10 transmits data 104 to the data receiver 20 (step S20). The data transmitter 10 delivers a value (rvs) 110 representative of the amount of data transmitted to the accumulator manager 18b at a timing T4 shown in FIG. 6. The addition manager 18b adds the value 110 to its existing sum to thereby produce a new sum (sum_dsz) 174 (step S22). This addition occurs at a timing T5 shown in FIG. 6.

The monitor/controller 18c compares the sum (sum_dsz) with the initial maximum data amount or limit (dflt_max=limit) to see if the former is greater than or equal to the latter (step S24). If the answer of the step S24 is YES, then the monitor/controller 18c proceeds to dealing with an excess of the data to be transmitted. If the answer of the step S24 is NO, then the monitor/controller 18c executes time decision processing shown in FIG. 5 via a connector A.

As for processing the excess of the data to be transmitted, the monitor/controller 18c causes the control signal 108 to go high, which is in turn fed to the data transmitter 14 in order to inhibit the data transmitter 14 from transmitting data further (step S26). This occurs at a timing T6 shown in FIG. 6. The data transmitter 14 is inhibited from sending out a transmission request signal to the data receiver 20 by the control signal 108 (timing T7, FIG. 6). This condition continues until the monitor/controller 18c causes the control signal 108 to go low.

However, as shown in FIG. 6, the data transmitter 14 sends out the transmission request signal 102A even after the timing T7 at which the control signal 108 has gone high. This is because the data transmitter 14 is so configured as to transmit data even after the inhibition of transmission until the entire data sequence existing before the inhibition has been sent. Consequently, the data transmitter 14 sends out the transmission request signal 102A to the data receiver 20 even at a timing T8. Thereafter, the data transmitter 14 transmits the data to the data receiver 20 in bursts and therefore does not send out any transmission request signal. It follows that the data transmitter 14 does not enter a new transmission sequence over the management time period, i.e., so long as the control signal 108 remains in its high level.

Subsequently, the monitor/controller 18c determines and holds an excess value (step S28). More specifically, the monitor/controller 18c subtracts the sum (sum_dsz) from the current maximum data amount (dflt_max=limit) to thereby produce an excess value (exceed). The monitor/controller 18c holds the excess value while feeding it to the maximum transmission amount generator 18d.

The step S28 is also followed by the time decision processing shown in FIG. 5 via the connector A. As shown, the management time converter 18a determines whether or not a unit burst time, i.e., unit burst control time has elapsed on the basis of the time counted by the timer 180b (step S30). The timer 180b counts a time interval represented by the data amount (rate_r) for a unit burst control time, which is output from the control time calculator 16. An output burst interval shown in FIG. 6 shows a specific burst control time.

If the unit burst control time has not elapsed, as determined by the management time converter 18a (NO, step S30), then the data transmission control 18 again executes the step S18, FIG. 4, via a connector B. If the unit burst control time has elapsed (YES, step S30), then the management time converter 18a increments a counter, not shown, included in the timer 180b (step S32). The converter 18a then determines whether or not the counter has reached a threshold corresponding to the management time period (step S34).

If the counter has reached the above threshold or its full count, i.e., if the management time has elapsed (YES, step S34), then the timer 180b outputs the flag signal (base_flag) 172 (step S36). If the answer of the step S34 is NO, the operation returns to the step S18 of FIG. 4 via the connector B to see if transmission is allowed. The flag signal 172 causes the data transmitter 10 to repeatedly transmit data to the data receiver 20 in accordance with the results of decision output in the steps S30 through S34. Consequently, the data transmitter 10 controls the amount of data to transmit in accordance with the management time period.

After the step S36, the maximum transmission amount generator 18d generates a new maximum data amount (dflt- _max) for the next data transmission as the limit and then updates the current limit with the new limit (step S38). More specifically, the maximum amount is updated on the basis of the excess value (exceed) to be reset at the timing of the flag signal 172 (limit=dflt_max−exceed).

The excess value to be used for the above updating purpose is a difference between the cumulative sum (sum_dsz) output from the accumulator manager 18b and the maximum data amount or limit (dflt_max=limit). Therefore, the parameters used to determine the limit, particularly the sum, should preferably be reset after the limit has been determined (timing T9, FIG. 6). For this purpose, the management time converter 18a should preferably output the flag signal (base_flag) 172 after the maximum transmission amount generator 18d has output the limit, as stated earlier. As shown in FIG. 6, the management time period (base_time) extends from the timing T1 to the timing T9.

After the step S38, the monitor/controller 18c causes the control signal 108 to go now, canceling the inhibition of data transmission (step S40). This occurs at a timing T10 shown in FIG. 6.

The step S40 is followed by a step S42 for resetting the parameters, e.g., the sum (sum_dsz), excess value (exceed), and the count of the timer 180b to zero. Thereafter, the sequence returns to the step S18, FIG. 4, via the connector B in order to continue the operation of the data transmission apparatus 10. As shown in FIG. 6, the data transmitter 14, of course, sends out the next transmission request signal 102B to the data receiver 20 at a timing T12 following a timing T11 at which the transmitter 14 is allowed to transmit data.

How the required period of time (need_time) and management time period are selected will be described more specifically hereinafter. Assume that the rate 160 input to the control time calculator 16 takes a value A, that the unit data amount to be transmitted (mtud) 162 does a value b, and that the amount of data (rate_r) for a unit burst control time derived from the rate A does a value a. The rate-to-amount converter 16a stores the conversion table for selecting amounts of data a for a unit burst control time corresponding to the rate A. The conversion table uses numerical values X and Y as the values of candidates lying in an allowable range, where the numerical value X is smaller than the numerical value Y. That means that, a plurality of data amounts lying in a certain range for a unit burst control time exist for a given rate A. While the illustrative embodiment causes the rate-to-amount converter 16a to select two numerical values out of the conversion table for comparison, the actual number of numerical values depends on the range of rates.

If a relation of X<a<Y holds, then the illustrative embodiment selects the numerical value X smaller than the amount of data a for surely effecting data transmission. The required period of time (need_time) is produced from the amount of data X selected by the time selector 16b and the unit data amount (mtud), i.e., by dividing the unit data amount (mtud) by the numerical value X (mtud/X). Assume that the required period of time m is obtained.

On receiving the required period of time m, the management time converter 18a selects a management time period. More specifically, the management time selector 180a included in the management time converter 18a is adapted to store a conversion table like the time selector 16b. In order to reference the conversion table, the management time selector 180a scans the conversion table with the required period of time m to thereby select numerical values X1 and Y1 as candidate, allowable unit management times. There holds a relation of X1<m<Y1. While the illustrative embodiment causes the selector 180a to select two numerical values out of the conversion table, the actual number of numerical values depends on the range of required periods of time.

When the required period of time m lies in the range of X1<m<Y1, the management time selector 180a selects Y1, which is the upper limit of the allowable unit management time, as a management time period (base_time). After selecting the management time period Y1, the selector 180a multiplies the time period Y1 (base_time) by the data amount of data a (rate_r) for a unit burst control time to thereby produce a maximum data amount or limit (dflt_max). This maximum data amount is the initial upper limit (limit) that satisfies the rate for the management time period.

Figure 7:
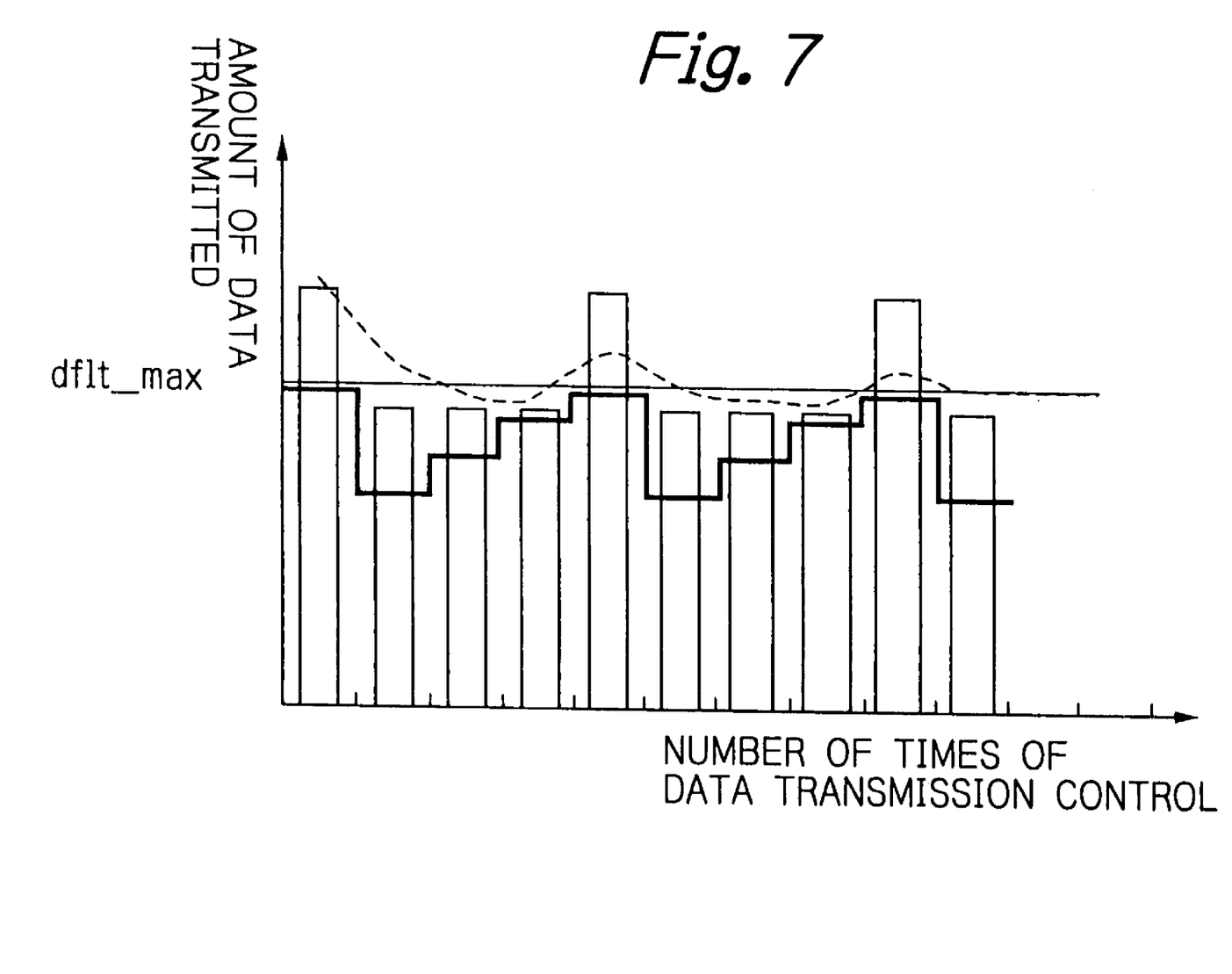
FIG. 7 plots the amount of data actually transmitted, the maximum limit below which data is to be transmitted, and the mean amount of data transmitted achievable with the illustrative embodiment.

Subsequently, the excess value (exceed) is subtracted from the maximum data amount (dflt_max=limit) to thereby produce an error, which is a maximum data amount or limit for the next data transmission, as stated previously. The excess value is a variable represented by a difference between the cumulative sum (sum_dsz) and the current maximum data amount (dflt_max=limit). For example, when the excess value is greater, the maximum data amount for the next data transmission is set to be reduced accordingly. In this manner, the illustrative embodiment varies the maximum data amount in accordance with the excess value for thereby absorbing the early-mentioned error. FIG. 7 shows specific amounts of data actually transmitted (bars), a specific variation of the maximum data amount or limit (bold line), and a specific variation of the mean amount of data transmitted (dotted line). As FIG. 7 indicates, the mean amount of data transmitted for a management time period sequentially approaches the initial maximum data amount (dflt_max) in an oscillatory convergence fashion.

As stated above, the illustrative embodiment controls data transmission that meets a rate input from the outside of the apparatus 10, while satisfying a condition on the unit data amount. Also, the illustrative embodiment reduces the excess of data transmission with respect to the maximum data amount (dflt_max=limit; expected control value) and thereby efficiently satisfies required conditions without interrupting data transmission. Moreover, the illustrative embodiment simplifies the selection of a management time by using a conversion table in accordance with two parameters input from the outside. This successfully omits calculation and thereby enhancing rapid processing while scaling down the circuitry.

As for the required period of time (mtud/rate_r), the illustrative embodiment selects a value closest to, but smaller than, the value a out of the conversion table in accordance with the rate A. The illustrative embodiment can therefore easily determine a required period of time matching with the rate A. As for the management time period that allows the required period of time, the illustrative embodiment can easily select a value closest to, but greater than, the required period of time m out of the conversion table.

As for the management time period, the expected value means how many times the minimum unit data amount (mtud) should be transmitted in fractions when transmitted in the form of an amount of data (rate_r) for a unit burst control time. Stated another way, the rate is satisfied if the minimum unit data amount (mtud) is transmitted at a time interval produced by dividing the minimum unit amount by the amount of data for a unit burst control time. This time interval is the minimum necessary control time. The illustrative embodiment transmits the maximum or limit amount of data (dflt_max) over the management time period that allows the minimal necessary control time, thereby realizing data transmission that satisfies the rate.

The illustrative embodiment can absorb an error introduced in the management time period by the conversion of the rate and that of the required period of time. For this purpose, the illustrative embodiment uses the product of the management time period and the rate (rate_r) represented by the amount of data for a unit burst control time as the limit (dflt_max).

The illustrative embodiment has concentrated on a data transmission apparatus. The present invention is similarly applicable to a system including a plurality of data transmission apparatuses each having the configuration shown and described and connected to a single higher-level data receiver via channels of the same frequency band. In such a case, too, the present invention allows each data transmission apparatus to transmit data to the data receiver by a particular mean amount. Further, the data receiver can distribute the transmission band without interrupting data transmission. The individual data transmitter can, of course, guarantee the transmission of the minimum data amount and the upper limit of management value by reducing the upper limit of the data amount.

In summary, it will be seen that the present invention provides a data transmission apparatus capable of reducing a circuit scale, allowing data to be transmitted in any desired mean amount, and enhancing the transmission of an accurate amount of data.

The entire disclosure of Japanese patent application No. 2001-50248 filed on Feb. 26, 2001, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A data transmission apparatus for sending out a transmission request signal to a data receiver unit and transmitting, on receiving a transmission permission signal from said data receiver unit, data to said data receiver unit, said data transmission apparatus comprising:

a data transmitter for transmitting data input thereto to said data receiver unit;

a transmission time calculator for calculating a transmission time period up to a time when the data transmitted reaches an amount determined in accordance with a plurality of parameters, which are input from outside of said data transmission apparatus; and a control circuit for setting, based on the transmission time period, a maximum amount of data to be transmitted next and controlling transmission of the data;

said control circuit comprising:

a management time calculator for converting the transmission time period to a unit management time period representative of a transmission in unit time for management, determining allowable unit management time periods allowable for the unit management time, selecting one of said allowable unit management time periods as a management time period, calculating the maximum amount of data, and generating a timing signal indicative of an elapse of the management time period;

an accumulator manager for holding and managing a total amount of data transmitted;

a maximum transmission amount generator for generating the maximum amount of data to be transmitted next as a limit while updating the limit; and a monitor/controller for comparing the total amount of data with the maximum amount, inhibiting, based on a result of comparison, said data transmitter from transmitting data or canceling an inhibition while holding, when the total amount exceeds the maximum amount, a difference between the total amount and the maximum amount, and feeding the difference to said maximum transmission amount generator.

2. The apparatus in accordance with claim 1, wherein said transmission time calculator uses, among the plurality of parameters, a transmission rate lying in a range that allows data to be transmitted for a unit period of time and a unit amount of data to be transmitted by a single transmission.

3. The apparatus in accordance with claim 2, wherein said transmission time calculator comprises:

a unit converter for converting the transmission rate lying in the allowable range to a preselected unit; and an allowable time generator for determining an allowable range of transmission time periods in which the unit amount of data can be transmitted at the transmission rate lying in the allowable range, and selecting one of allowable transmission time periods lying in the allowable range.

4. The apparatus in accordance with claim 1, wherein said management time calculator selects, as the management time period, one of the allowable unit management time periods corresponding to the allowable range of transmission time periods, multiplying the unit management time period selected by a transmission rate to thereby produce a maximum amount of data to be transmitted as an initial limit, and outputting the management time period and the initial limit; and a counter for counting a time up to an elapse of the management time period and outputting a timing signal on the elapse of the management time period.

5. The apparatus in accordance with claim 2, wherein said management time calculator selects, as the management time period, one of the allowable unit management time periods corresponding to the allowable range of transmission time periods, multiplying the unit management time period selected by the transmission rate to thereby produce a maximum amount of data to be transmitted as an initial limit, and outputting the management time period and the initial limit; and a counter for counting a time up to an elapse of the management time period and outputting a timing signal on the elapse of the management time period.

6. The apparatus in accordance with claim 3, wherein said management time calculator selects, as the management time period, one of the allowable unit management time periods corresponding to the allowable range of transmission time periods, multiplying the unit management time period selected by the transmission rate to thereby produce a maximum amount of data to be transmitted as an initial limit, and outputting the management time period and the initial limit; and a counter for counting a time up to an elapse of the management time period and outputting a timing signal on the elapse of the management time period.

7. The apparatus in accordance with claim 1, wherein said accumulator manager outputs, after said maximum transmission amount generator has determined the maximum amount of data to be transmitted next, a timing signal in response to the elapse of the management time period.

8. The apparatus in accordance with claim 2, wherein said accumulator manager outputs, after said maximum transmission amount generator has determined the maximum amount of data to be transmitted next, a timing signal in response to the elapse of the management time period.

9. The apparatus in accordance with claim 3, wherein said accumulator manager outputs, after said maximum transmission amount generator has determined the maximum amount of data to be transmitted next, a timing signal in response to the elapse of the management time period.

10. The apparatus in accordance with claim 4, wherein said accumulator manager outputs, after said maximum transmission amount generator has determined the maximum amount of data to be transmitted next, a timing signal in response to the elapse of the management time period.

* * * * *